United States Patent
Cahill et al.

(10) Patent No.: US 11,411,881 B2
(45) Date of Patent: *Aug. 9, 2022

(54) ORGANIZATION LEVEL IDENTITY MANAGEMENT

(71) Applicant: Amazon Technologies, Inc., Reno, NV (US)

(72) Inventors: Conor Patrick Cahill, Waterford, VA (US); Jasmeet Chhabra, Bellevue, WA (US); Daniel Stephen Popick, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/866,961

(22) Filed: May 5, 2020

(65) Prior Publication Data
US 2020/0267090 A1 Aug. 20, 2020

Related U.S. Application Data

(63) Continuation of application No. 15/836,565, filed on Dec. 8, 2017, now Pat. No. 10,715,458.

(51) Int. Cl.
*H04L 47/70* (2022.01)
*H04L 9/40* (2022.01)
(Continued)

(52) U.S. Cl.
CPC .............. *H04L 47/70* (2013.01); *G06F 21/31* (2013.01); *G06F 21/45* (2013.01); *G06Q 10/00* (2013.01);
(Continued)

(58) Field of Classification Search
None
See application file for complete search history.

(56) References Cited

U.S. PATENT DOCUMENTS

| | | | | |
|---|---|---|---|---|
| 7,349,874 B1 * | 3/2008 | Hood | ..................... | G06Q 40/00 705/35 |
| 8,966,570 B1 * | 2/2015 | Roth | ................... | H05K 999/99 726/28 |

(Continued)

OTHER PUBLICATIONS

Non-Final Office Action issued in U.S. Appl. No. 15/836,565 dated May 30, 2019.
(Continued)

*Primary Examiner* — Lashonda Jacobs-Burton
(74) *Attorney, Agent, or Firm* — Hogan Lovells US LLP

(57) ABSTRACT

User identities can managed at an organization level, instead of across multiple individual resource accounts. In a resource provider environment, access to various resources and services may require users to have identities with specific resource accounts. Users can instead be associated with organization accounts, or virtual accounts that are not associated with specific resources or services. The organization accounts are attached at the appropriate location(s) in an organizational hierarchy. A user having an organization account can project the identity in any sub-account in the organization hierarchy. This can include any lower-level resource account, or can child accounts under a relevant branch of the hierarchy. A user can validate against the organization account, and receive access to the relevant service or resources using the identity projected in the corresponding resource account.

20 Claims, 6 Drawing Sheets

(51) Int. Cl.
*H04L 67/146* (2022.01)
*G06F 21/45* (2013.01)
*H04L 67/02* (2022.01)
*G06Q 10/00* (2012.01)
*G06F 21/31* (2013.01)

(52) U.S. Cl.
CPC ............ *H04L 63/102* (2013.01); *H04L 67/02* (2013.01); *H04L 67/146* (2013.01)

(56) References Cited

U.S. PATENT DOCUMENTS

| | | | |
|---|---|---|---|
| 9,069,947 B2* | 6/2015 | Kottahachchi | G06F 21/45 |
| 9,098,675 B1* | 8/2015 | Roth | H04L 63/102 |
| 9,276,942 B2* | 3/2016 | Srinivasan | H04L 63/101 |
| 9,424,429 B1* | 8/2016 | Roth | G06F 3/011 |
| 9,602,545 B2* | 3/2017 | Pitre | H04L 63/102 |
| 9,667,610 B2* | 5/2017 | Theebaprakasam | H04L 63/08 |
| 9,686,261 B2* | 6/2017 | Roth | G06F 21/62 |
| 9,754,091 B2* | 9/2017 | Kode | H04L 63/102 |
| 9,769,153 B1* | 9/2017 | Bowen | H04L 63/0823 |
| 9,819,673 B1* | 11/2017 | Johansson | H04L 63/102 |
| 10,567,381 B1* | 2/2020 | Baer | H04L 63/068 |
| 10,715,514 B1* | 7/2020 | Threlkeld | H04L 63/0807 |
| 2002/0161706 A1* | 10/2002 | Brinskele | G06Q 20/105 705/41 |
| 2005/0144452 A1* | 6/2005 | Lynch | G06F 21/33 713/170 |
| 2006/0206931 A1* | 9/2006 | Dillaway | H04L 63/0823 726/9 |
| 2007/0097860 A1* | 5/2007 | Rys | H04N 21/4532 370/389 |
| 2007/0214179 A1* | 9/2007 | Hoang | G06F 16/2428 |
| 2007/0289024 A1* | 12/2007 | Mohammed | G06F 21/604 726/28 |
| 2008/0098485 A1* | 4/2008 | Chiou | G06F 21/604 726/28 |
| 2009/0144183 A1* | 6/2009 | Gatch | G06Q 30/04 705/34 |
| 2009/0150981 A1* | 6/2009 | Amies | H04L 67/02 726/5 |
| 2011/0112939 A1* | 5/2011 | Nelson | G06Q 40/12 715/777 |
| 2011/0137760 A1* | 6/2011 | Rudie | G06Q 40/02 705/30 |
| 2011/0258683 A1* | 10/2011 | Cicchitto | G06F 21/604 726/4 |
| 2013/0019276 A1* | 1/2013 | Biazetti | H04L 63/102 726/1 |
| 2013/0086380 A1* | 4/2013 | Krishnaswamy | H04L 63/102 713/168 |
| 2014/0013447 A1* | 1/2014 | Hotti | G06F 21/6218 726/28 |
| 2014/0101734 A1* | 4/2014 | Ronda | G06F 21/74 726/5 |
| 2014/0165133 A1* | 6/2014 | Foley | H04L 63/105 726/1 |
| 2014/0282938 A1* | 9/2014 | Moisa | H04L 63/08 726/6 |
| 2015/0120929 A1* | 4/2015 | Lin | H04L 12/1457 709/226 |
| 2015/0163158 A1* | 6/2015 | Ryland | H04L 45/00 709/225 |
| 2015/0180872 A1* | 6/2015 | Christner | H04L 63/10 726/4 |
| 2015/0334119 A1* | 11/2015 | Schmitt | H04W 12/084 726/3 |
| 2015/0350194 A1* | 12/2015 | Gilpin | H04L 63/0815 726/8 |
| 2016/0092802 A1* | 3/2016 | Theebaprakasam | G06Q 10/0631 705/7.12 |
| 2016/0335454 A1* | 11/2016 | Choe | G06Q 30/018 |
| 2017/0048114 A1* | 2/2017 | Liu | H04L 67/10 |
| 2017/0366394 A1* | 12/2017 | Kurian | H04L 63/10 |
| 2018/0089299 A1* | 3/2018 | Collins | G06F 16/282 |
| 2018/0197216 A1* | 7/2018 | Sundhar | G06Q 30/0601 |
| 2018/0375886 A1* | 12/2018 | Kirti | H04L 41/28 |
| 2019/0138363 A1* | 5/2019 | Reed | G06F 9/5027 |

OTHER PUBLICATIONS

Final Office Action issued in U.S. Appl. No. 15/836,565 dated Oct. 31, 2019.

Notice of Allowance issued in U.S. Appl. No. 15/836,565 dated Mar. 11, 2020.

* cited by examiner

ORGANIZATION LEVEL IDENTITY MANAGEMENT

CROSS-REFERENCES TO RELATED APPLICATIONS

This application is a continuation of allowed U.S. application Ser. No. 15/836,565, entitled "ORGANIZATION LEVEL IDENTITY MANAGEMENT," filed Dec. 8, 2017, and issued as U.S. Pat. No. 10,715,458, the full disclosure of which is incorporated by reference herein for all purposes.

BACKGROUND

Users are increasingly performing tasks using remote computing resources, often referred to as part of "the cloud." This has many advantages, as users do not have to purchase and maintain dedicated hardware and software, and instead can pay for only those resources that are needed at any given time, where those resources typically will be managed by a resource provider. Because a resource provider will often provide resource access to many different users, various types of credentials can be used to authenticate a source of the request, as well as to demonstrate that the source is authorized to access a resource to perform a task. In order to obtain access to various resources in conventional approaches, a user must be authorized under an account having the appropriate access permissions. For large organizations with many users and accounts, this can create a complex management responsibility to ensure that all users are associated with the appropriate accounts. This can come with significant resource overhead and capacity requirements. Such approaches can also result in erroneous access being granted in some instances, or incorrect levels of access being granted for the user being associated with an account with the incorrect access permissions.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches described and suggested herein relate to the management of access to resources in an electronic environment. In particular, various approaches provide for the organization of user identities at an organization level, for example, such that user identities do not need to be updated and managed across multiple individual resource accounts. In a resource provider environment, access to various resources and services may require users to have identities or other associations with specific resource accounts. To simplify the management of various user accounts, users can instead be associated with organization accounts, or virtual accounts or identities that are not associated with any particular resources or services. The organization accounts can be attached at the appropriate location(s) in an organizational hierarchy, or other such structure, under a single master account for the organization. A user having an organization account can project or otherwise manifest itself in any sub-account under the organization account in the organization hierarchy. This can include any lower-level resource account in some embodiments, or can include child accounts under a relevant branch of the tree or organizational unit, among other such options. A user can validate against the organization account, then receive access to the relevant service or resources under the corresponding resource account. The user can receive a session token or other such credential in some embodiments to obtain the access. The service or resource(s) can then process requests from the user as if the user has an identity in, or is otherwise associated with, the relevant resource account. In this way, an organization can create identities for users that can be projected in any appropriate sub-accounts (or corresponding accounts of the structure) for that organization.

Various other such functions can be used as well within the scope of the various embodiments as would be apparent to one of ordinary skill in the art in light of the teachings and suggestions contained herein.

Figure 1:
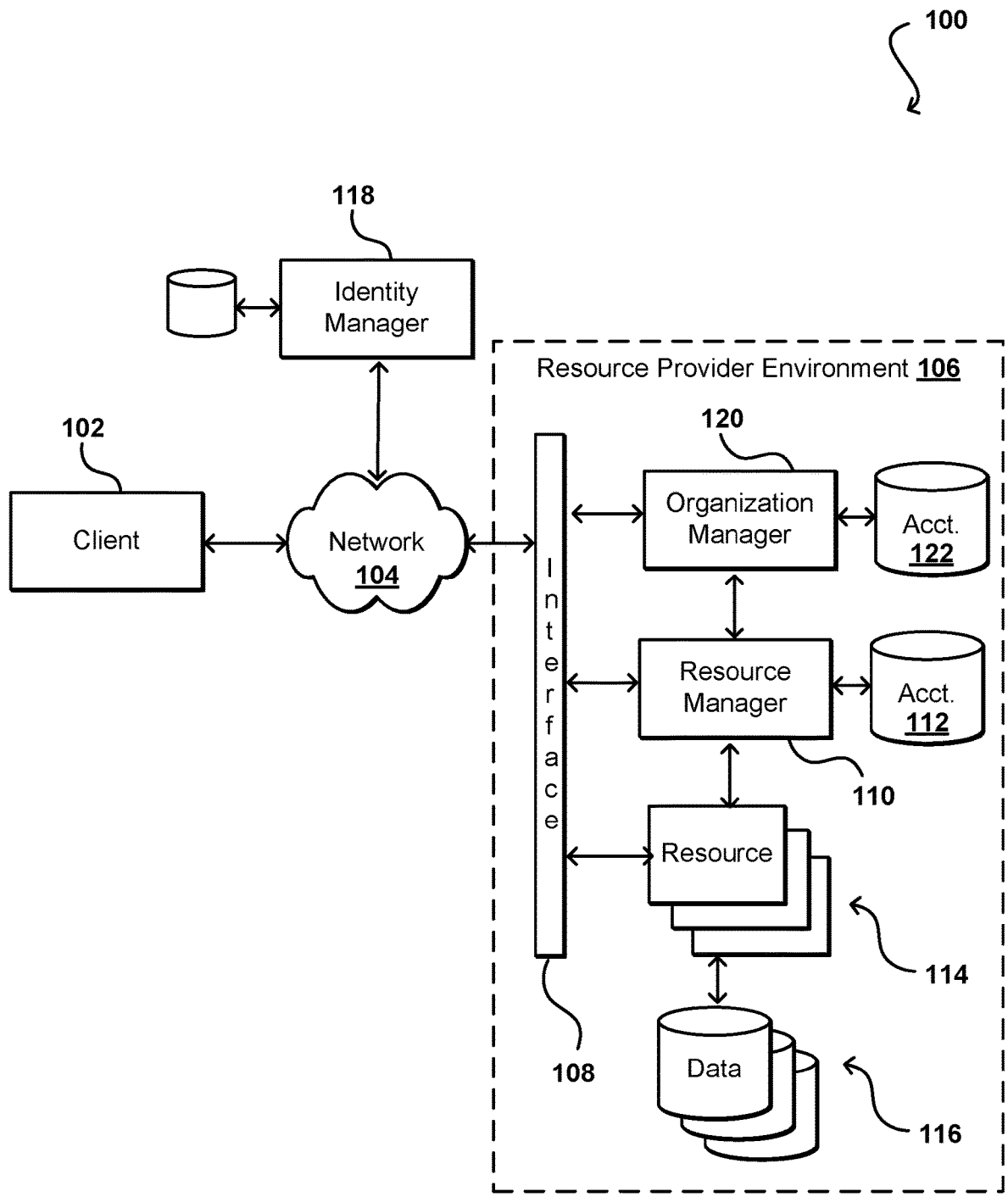
FIG. 1 illustrates an example environment in which various embodiments can be implemented.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment can include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, an access key identifier and a secret key, biometric data, a digital signature, or other such information. These credentials can be provided by, or obtained from, a number of different entities, such as an identity manager 118, a key management service, a corporate entity, an identify broker such as a SAML provider, and the like. In some embodiments, a user can provide information useful in obtaining the credentials, such as user identity, account information, password, user-specific cryptographic key, customer number, and the like. The identity manager can provide the credentials to the resource provider environment 106 and/or to the client device 102, whereby the client device can utilize those credentials to obtain access or use of various resources in the provider environment, where the type and/or scope of access can depend upon factors such as a type of user, a type of user account, a role associated with the credentials, or a policy associated with the user and/or credentials, among other such factors. In some embodiments the resources or operators within the environment can obtain credentials useful in signing commands or requests for various purposes as discussed and suggested herein. Although illustrated outside the resource provider environment, it should be understood that the identity manager could be a service offered from within the resource provider environment, among other such options.

The resource provider can validate this information against information stored for the user. If the user has an account with the appropriate permissions, status, etc., the resource manager 110 can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes. The same or a different authentication method may be used for other tasks, such as for the use of cryptographic keys. In some embodiments a key management system or service can be used to authenticate users and manage keys on behalf of those users. A key and/or certificate management service can maintain an inventory of all keys certificates issued as well as the user to which they were issued. Some regulations require stringent security and management of cryptographic keys which must be subject to audit or other such review. For cryptographic key pairs where both public and private verification parameters are generated, a user may be granted access to a public key while private keys are kept secure within the management service. A key management service can manage various security aspects, as may include authentication of users, generation of the keys, secure key exchange, and key management, among other such tasks.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, a user may require access to various services or resources that may be associated with different accounts, referred to herein as resource accounts, although it should be understood that this name is used for convenience and is not intended to imply that an account is for a specific resource or is granted to a specific resource unless otherwise stated. Instead of having each customer or member of an organization have an identity in each of these resource accounts, which must then be managed accordingly, the customer can instead have an organization account, also referred to herein as a virtual account, created and managed by an organization manager 120 or other such system or service. A virtual account can correspond to a single user or a group of users, as may be associated with a particular department or role. In some embodiments a virtual account can correspond to a virtual pool of identities that can be projected in any of the relevant sub-accounts, among other such options. The customer can submit a request from a client device 102 that is received by, or directed to, the organization manager 120, which can compare the credentials for the request against credentials stored in an organization account data store 122 in order to validate the credentials under the organization account. The organization manager can also determine, from the request or otherwise, the resource account under which the request is to act. This can include determining an account specified in a header of the request, or determining the relevant account based on the service or resource access requested, among other such options. The organization manager can utilize an organization structure, such as an organization hierarchy, stack, or mapping, to determine whether the organization account is entitled to project itself in the relevant resource account. This can include, for example, determining whether the organization account is at a higher level than the resource account in the organization hierarchy. If the credentials are validated in the organization account and the organization account has access rights to the resource account, then a session token or other information can be provided that can enable the customer to act within the specified account. The service being accessed would then function, at least with respect to customer requests, as if the customer has an identity within the specific resource account. For example, subsequent requests on the session could include the session token and could then be allowed by the resource manager 110 to access the relevant service resources under the specified resource account. Another advantage to such an approach is that the user need only remember and/or present a single set of credentials for the organizational account, or master account, rather than different sets of credentials for each relevant resource account.

Figure 2:
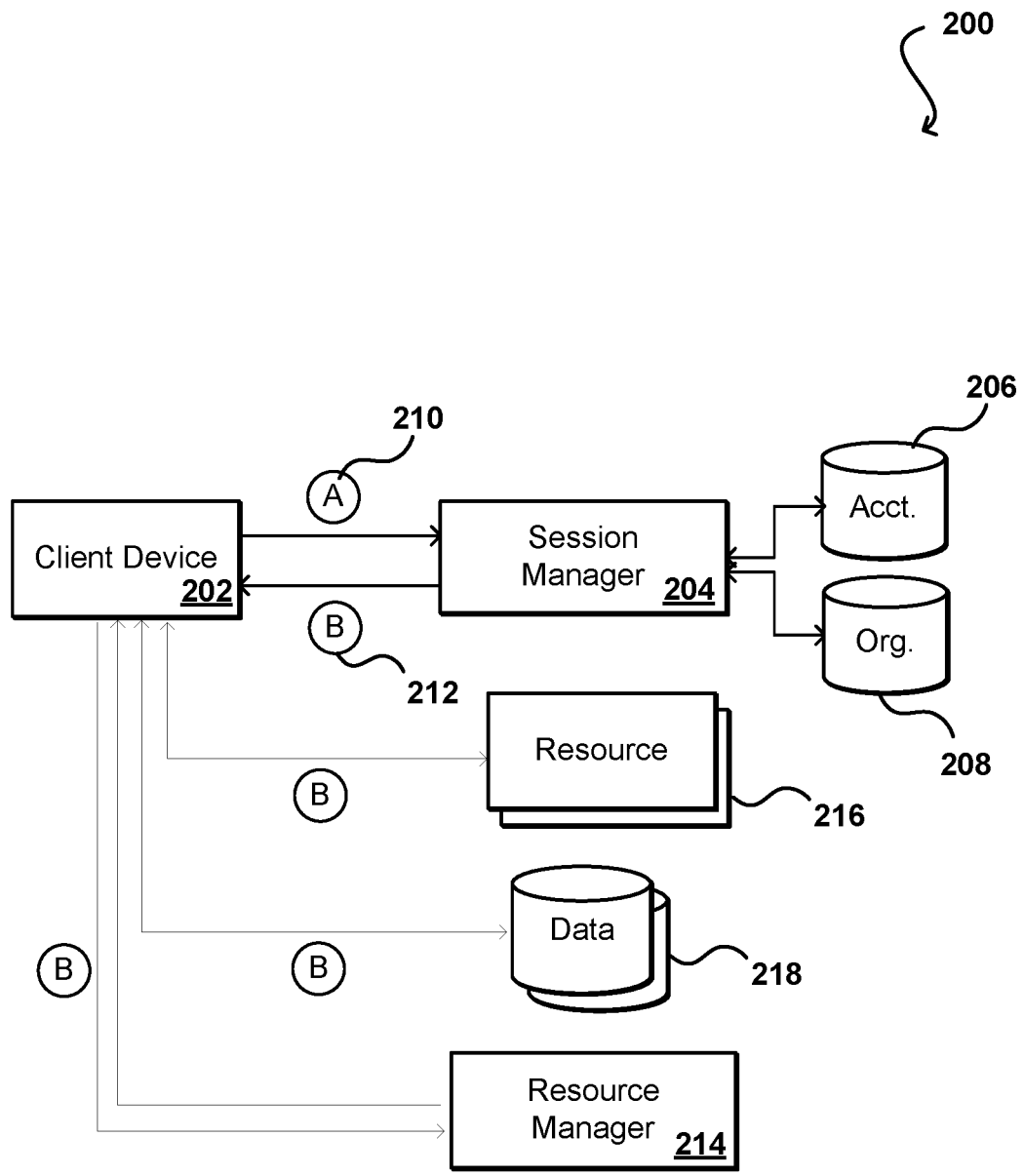
FIG. 2 illustrates an example communication flow through an environment such as that described with respect to FIG. 1.

FIG. 2 illustrates an example request flow 200 that can be utilized in accordance with various embodiments. In this example, a client device 202 is attempting to gain access to a service that utilizes resources such as computer resources 216 and data storage resources 218 in a resource provider environment. Access to the resources is permitted under a corresponding resource account. In this example, the client device is acting on behalf of a user who does not have an identity in the resource account, but instead has an identity in a virtual organization account (or other such account as discussed and suggested herein). Accordingly, the client device can submit a request to access a service or initiate a session that is directed to a session manager 204, although a mentioned elsewhere herein a request including a designation of a target resource account can be directed directly to the resource manager 214. The request directed to the session manager 204 can include a set of user credentials 210 that can be used to validate the request. The session manager 204 can compare the credentials 210 against credentials stored in an organization account data store 206 to validate the credentials and ensure that the request is authorized for the requested access. In order to determine whether the request can be authorized, the session manager 204 can analyze an organization hierarchy or mapping stored in an organization data store 208 or other such location. This can include, for example, identifying an attachment point for the user organization account in the hierarchy and determining whether the resource account is a sub-account at a lower level in the hierarchy to which the user is granted access. If so, a session can be created for the user and a session token 212 provided to the client device in this example, although session tokens are not required in all embodiments and other authentication mechanisms can be used as well as discussed and suggested elsewhere herein. Once receiving the session token 212, or if indicating the target resource account in the request as discussed elsewhere herein, the client device 202 can submit requests on the session to a resource manager 214 for the resources or can submit requests directly to the resources, among other such options. The requests including the session token can then be processed by the resources and/or service as if the user had an identity or role in the corresponding account. In at least some embodiments additional data, such as metadata in a request header, can indicate the resource account under which the request is acting as well as the organization account that was used to obtain the account access, at least for auditing and security purposes. The resources and resource account in at least some embodiments may not be aware of the organization account or the fact that the user does not have a role within that account.

Figure 3:
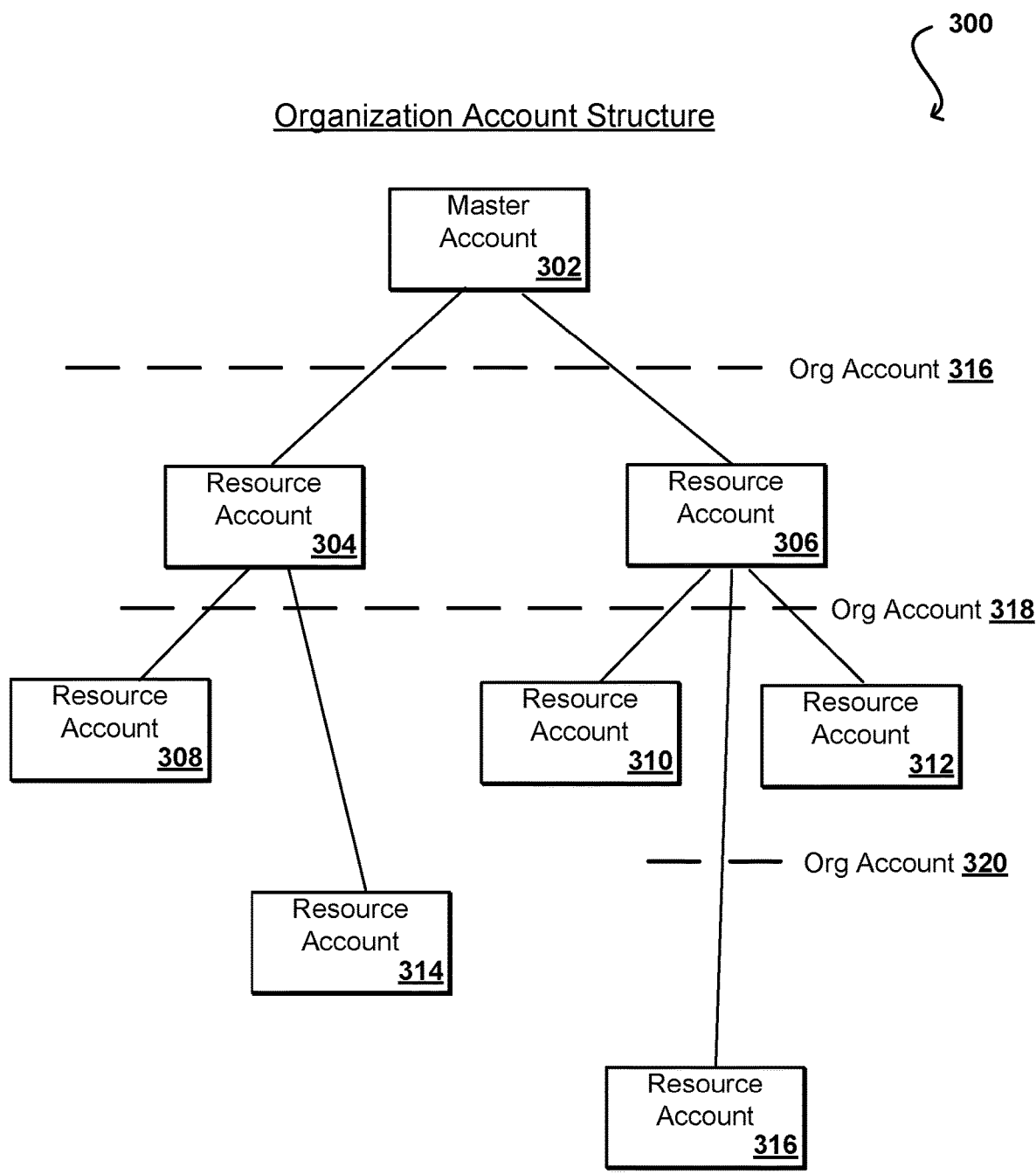
FIG. 3 illustrates an organization hierarchy that can be utilized in accordance with various embodiments.

In some embodiments, an organization (or enterprise or other such entity) may have a single master account 302 established, such as is illustrated in the example account hierarchy 300 of FIG. 3. As discussed elsewhere herein, there may also be multiple master accounts wherein a virtual identity pool that belongs to one organization account can project itself in master accounts for multiple organizations, providing for organization of organizations. A single organization account can also be attached to locations in multiple master accounts, or multiple related or unrelated account hierarchies, within the scope of various embodiments. In this example, there are multiple resource accounts 304, 306, 308, 310, 312, 316 associated with, and managed from within, this master account. As mentioned, each of these resource accounts may be with a resource provider, and may come with access permissions to one or more resources provided through a resource provider environment. There may be various rules or policies that indicate the type(s) of access granted under each account, as may depend upon factors such as a role or type of user, among other such options. As an example, where the access to the resources is provided through services such as Web services, service control policies can be utilized to limit and/or control which service features are available from within a specified resource account. As the number of services managed under these policies increases, there is an increasing need to create roles, such as service-connected roles, within various resource accounts, and sub-accounts, within the organizational structure. While a service-linked role might be utilized in each sub-account and used to establish roles for other services, such an approach may have issues with scalability when signification changes are made to the organizational structure or hierarchy 300. As an example, if a service is enabled on an organization of 2,500 accounts then a role could be assumed in each of those accounts with calls being made to create the roles and attach the relevant role policy, among other such actions, resulting in thousands of write operations in a relatively short period of time.

Accordingly, approaches in accordance with various embodiments can maintain a virtual identity pool that includes a set of virtual accounts, also referred to herein as organizational accounts 316, 318, 320. Each of these accounts is positioned in the organizational hierarchy 300 and can be associated with the appropriate user credentials (e.g., username and password pairs) to enable a user to be authenticated to the system. Each of these virtual identities or virtual accounts can then be projected into any of the sub-accounts in the organizational hierarchy 300, or at least subsets of accounts associated with an organizational unit (OU). "Projecting" as used herein refers to an ability to act within a resource account as if the user or entity has an identity in that resource account, where an identity in an organization account can project itself in the resource sub-account for purposes of accessing the relevant resources or service. In one example, certain organizational accounts 316, 318 have access to any sub-accounts, or resource accounts located at lower levels in the organizational hierarchy. One of the organizational accounts 320, however, only has access to a sub-account 316 in the same organizational unit, and does not have access permission within another resource account 314 that is at a lower level in the hierarchy 300 but outside the organizational unit. Such an approach enables a single set of identities to be maintained within a master account 302 for an organization, where those identities can act within any relevant sub-accounts by indicating the target account on session creation or the call to the relevant service. This can avoid the need from conventional approaches wherein identities must be individually managed for each account.

As illustrated in the hierarchy, various identities or organizational accounts can be attached at various locations in the organizational hierarchy 300. If a user changes roles in the organization, for example, the organizational account for the user can be moved and/or attached to the appropriate location in the hierarchy and the corresponding account access with be available, without having to remove the user identity from the prior accounts or add the user identity to the new accounts. In some instances, a user can also be attached at multiple locations in the hierarchy, such as to enable the user to obtain access to any accounts or sub-accounts within an organizational unit or other portion of the organization hierarchy. From each attachment point, an identity can project itself in any of the resource accounts positioned below that attachment point in the organizational hierarchy. As mentioned, a user associated with an organizational account can request a session that acts in a specified sub-account, and after it is verified that the user can project itself in the specified sub-account, the user (or an application, resource, or device acting on behalf of the user) can obtain permission and access in the session as if the user has an identity associated with that specific sub-account. When an organization account or other virtual pool of identities is attached to node in an organizational hierarchy, the attachment may also bet an attachment scope down policy. Any identity in the pool then can only have rights that are an intersection of the scope down policy and the rights given to the principal in the account. In some embodiments, the organizational units (OUs) can instead be attached at various points in the organizational hierarchy. Organization accounts, user pools, and user identities can then be associated with these organizational units and able to project themselves into resource accounts associated with, or below, the organizational unit in the hierarchy. There can also be identities with roles in the specified resource accounts or organizational units as well, which can have the same or different permissions and applicable policies as the projected identities.

As mentioned, authentication of incoming requests, such as requests to create a session or call a service, can be managed by a separate service or handed off to a separate service if that request is received to a resource manager or other such management service associated with the resources and resource accounts. In some embodiments these requests will be directed to an organization manager without being first directed to the resource manager, although any such request received to the resource manager can be redirected to the organization manager as discussed elsewhere herein. Since the user has an account with the organization, the organization manager can accept and process the user credentials submitted with the request. The request can also include, such as in a header or other such location, information about the specific account under which the user wants to obtain access. The organization manager in this embodiment can also verify that the user identity has access rights to the specified account per the organizational hierarchy. If the user is permitted to act within the specified account, information can be returned indicating to the relevant service, resource, or resource manager that the user is authorized for access under the specified resource account. This access will then be provided even though the user does not actually have an identity within the specified account but with a virtual or organizational account that is higher in the organization hierarchy. The data provided under the session or from the service would then match what would otherwise be provided if the user had an identity within the specified resource account.

Since the user does not actually have a role inside the specified resource account, it can be desirable in at least some embodiments to pass at least some additional information than would otherwise be passed for a user having a role in that account. This information can be used during auditing, for example, to determine the user who took an action under a specific resource account, and the organizational account that was used to project that user in the specific resource account. The information should be contained in such a way that user requests are treated by the resource service as standard requests under that service, but that enable subsequent discovery during auditing or another such process. As mentioned, one approach would be for the identity to be managed on each service invocation. Another approach can enable the user (or user-associated device or application) to obtain a session token that can be used to obtain the access. The session token can indicate that the user is acting in the specified account. The session token can also indicate the corresponding organizational account, or the organization manager or other system or service granting the token can track the associations and the organization account that was used to obtain that specific session token, among other such options. The user can then use the session token to make requests directly to the relevant service as if the user has an identity within the associated resource account. In some embodiments the additional metadata stored can also indicate that the user account is a virtual or organization account, and can store a version identifier for the organizational hierarchy as well as the attachment point(s) for the organization account, among other such options. As mentioned, an organization account is also referred to as a virtual account here because the organization account does not have any resources or resource access granted through the organization account, and a user only obtains such permission by projecting the user in a resource account that has such access. Any call to a resource from the organizational account in various embodiments would fail, as that account does not have access rights to the resource. The request would have to indicate the resource account in which the user is acting in order to gain access.

In at least some embodiments, the resource accounts will have no control over which organization accounts are able to project themselves in the resource accounts. The control will be at the organization level based at least in part upon the determined attachment point(s). In some embodiments the organization can apply access policies or permissions to specific organization accounts, for example, where a user can project in a sub-account but there may be some restrictions on the access. This might relate to a type of user, role, or identity with which the user is to act within the account, among other such options. The organization might also put other restrictions on the account access as well, such as to specify that a particular organization account can project itself in any sub-account other than one or more specified accounts, or can gain access with different roles or user types in the different sub-accounts, etc. In various embodiments, the sub-accounts themselves cannot restrict the access of auditor, administrators, or other entities gaining access through a valid projecting into those accounts. In some embodiments a resource account may also not be able to view a list of users who potentially have access due to their locations higher in the organizational hierarchy.

Figure 4:
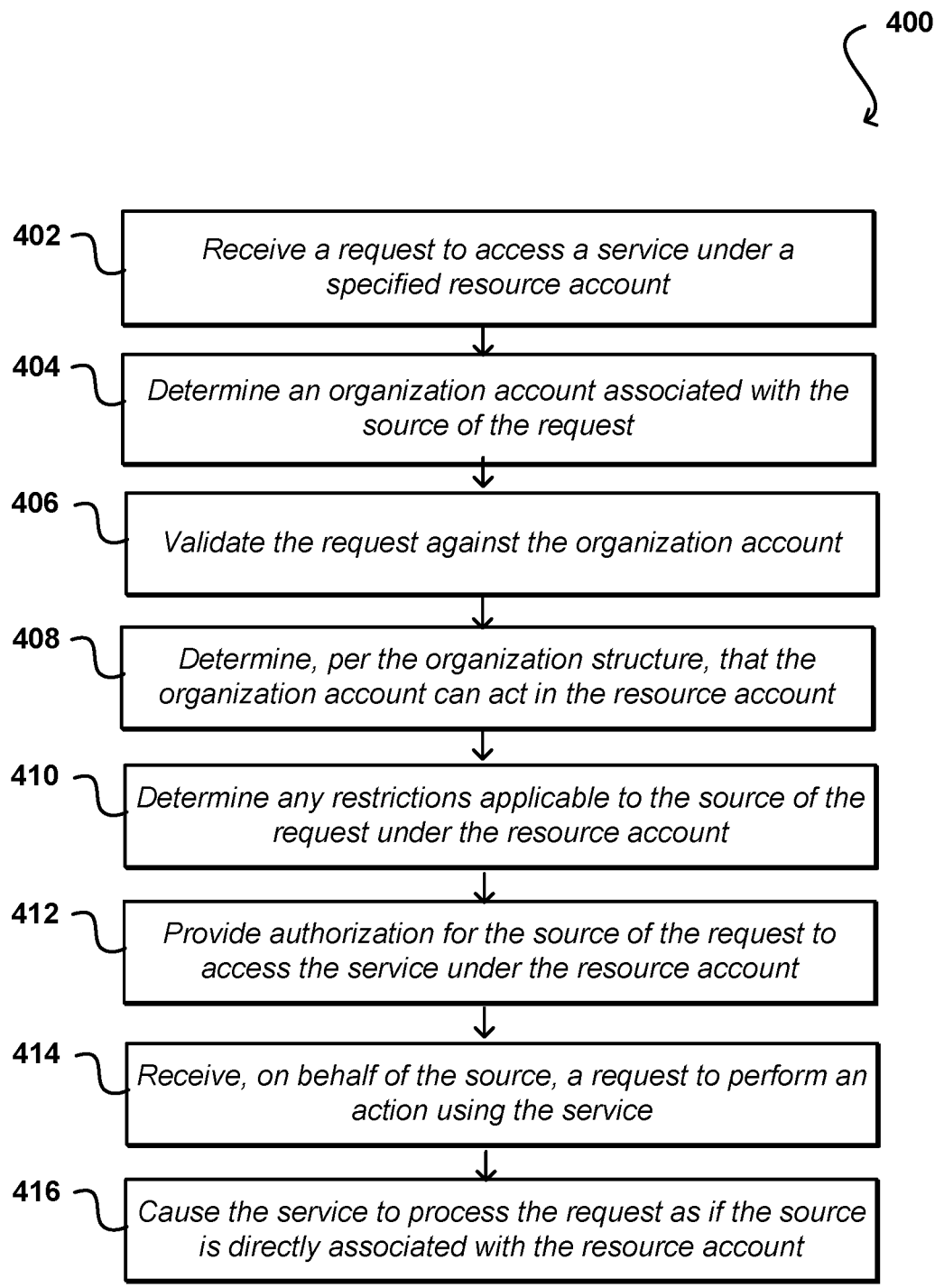
FIG. 4 illustrates an example process for managing access to a service according to an organization structure that can be utilized in accordance with various embodiments.

FIG. 4 illustrates an example process 400 for managing service access according to an organizational structure that can be used in accordance with various embodiments. It should be understood that for this and other processes discussed herein that additional, fewer, or alternative steps can be performed in similar or alternative steps, or in parallel, within the scope of the various embodiments unless otherwise stated. In this example, a request is received 402 to access a service, such as a Web service provided using one or more resources of a resource provider environment. The service is associated with a resource account, where entities having an identity with the resource account, or otherwise being associated with the resource account, are able to access the resources and utilize the service. In this example, the source of the request, such as a client device associated with a user, is not associated with the resource account specified by the request, such as where the user does not have an identity with the specific resource account.

In order to process the request, a determination can be made 404 as to the organization account with which the source of the request is associated. In this example, various users or other entities associated with the organization will each have a corresponding organization account, which is a virtual account that can be attached at an appropriate location in an organizational structure, such as a mapping or hierarchy. The organization account is referred to as a virtual account because even though the user can have an identity with the organization account, the organization account does not have access permissions for any resources or services as would a resource account, although in some embodiments an organization account may provide at least some permissions for other purposes, etc. If an organization account can be identified for the source of the request, the request can be validated 406 against the organization request. This can include, for example, comparing one or more user credentials against credentials for the organization account to determine that the user credentials are valid. Assuming the credentials are valid against the organization account, it can be verified 408 that the organization account is able to act in the resource account per the organizational structure. This can include, for example, the resource account being a sub-account to the organization account and/or being at a lower level in an organizational hierarchy or stack than the organization account, among other such options. In addition, a determination can be made 410 as to any restrictions applicable to the source of the request under the resource account. This can include, for example, restrictions on the type of permissions granted, roles available, sub-accounts to which access is not granted through the organization account, etc. If the source of the request can project in the resource account per the organization account then authorization can be provided 412 for the source of the request to access the service using the permissions of the resource account. In some embodiments metadata, a session token, a unique identifier, or other information may be provided for purposes of obtaining the access. Subsequently, a request can be received 414 on behalf of the source to perform an action using the service. Even though the source does not have direct access permissions to the service under the resource account, the permission granted under the organization account causes 416 the service to process the request as if the source is directly associated with the resource account. As mentioned, in many instances the service will be unable to distinguish users without identities in the resource account from those who have identities in that account.

Figure 5:
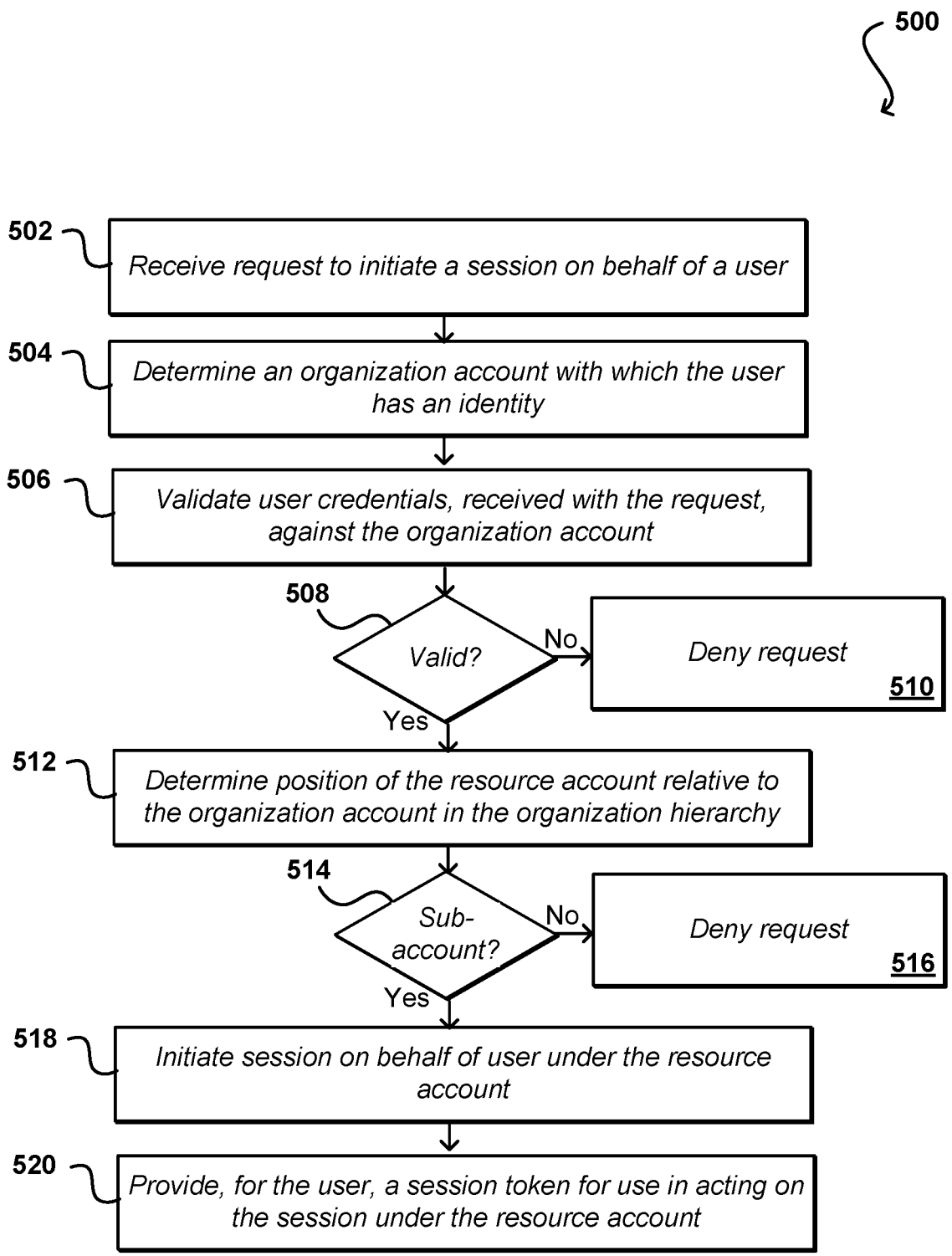
FIG. 5 illustrates an example process for initiating a session for an organization user without an identity in the corresponding resource account that can be utilized in accordance with various embodiments.

FIG. 5 illustrates an example process 500 for initiating a session for an organization account that can be utilized in accordance with various embodiments. In this example, a request to initiate a session on behalf of a user is received 502. The session is to be associated with one or more resources for which permission is required under a resource account, with which the user is not associated or does not have an identity. In order to attempt to process the request, an organization account is determined 504 with which the user has an identity or is otherwise associated. As mentioned, an organization or other entity may have a master account and a set of sub-accounts associated with an organization hierarchy. The sub-accounts can include virtual or organization accounts, associated with organization users, and resource accounts, which provide access to resource and services per the permissions of the respective accounts. User credentials, as may have been received with the request, can be validated 506 against the organizational account. Since the user is not associated with the resource account, the user in this example will need to be validated against the organization account with which the user is associated. If it is determined 508 that the credentials are not valid against the organization account then the request can be denied 510. If the credentials are determined to be valid against the organization account then the corresponding organization hierarchy can be determined. As mentioned, this can be a hierarchy or stack where various users or organizational accounts can be attached or located, and access to accounts lower in the hierarchy capable of being projected by the higher level users or organizational accounts. The position of the resource account for the session, relative to the organization account, in the organization hierarchy can be determined 512, and if the resource account is not a sub-account of the organization account, or otherwise within the lower level accounts to which the organization account can obtain access, then the request can be denied.

If the user credentials are valid and the resource account for the session is an available sub-account under the user organization account, the request can be granted and a session can be initiated 518 on behalf of the user under the resource account. The user would have been unable to obtain this session directly from the session resources because the user is not associated with, and does not otherwise have credentials for, the resource account. For the session, a session token can be provided 520 for the user (or a device, resource, or application acting on behalf of the user) for use in acting on the session under the resource account. As mentioned, this can be a session token or other credential that specifies at least the resource account under which the user is acting. In addition to providing the session token, information can be stored regarding the session in some embodiments, as may include a session identify, a user identifier, the organization account, the resource account, the version of the organization hierarchy, and the attachment point of the organization account on the organization hierarchy, among other such options. In many embodiments, however, the information will be stored in the token but not otherwise stored or available to the system. Subsequent requests received on the session can then include the session token for purposes of gaining access under the relevant resource account.

Figure 6:
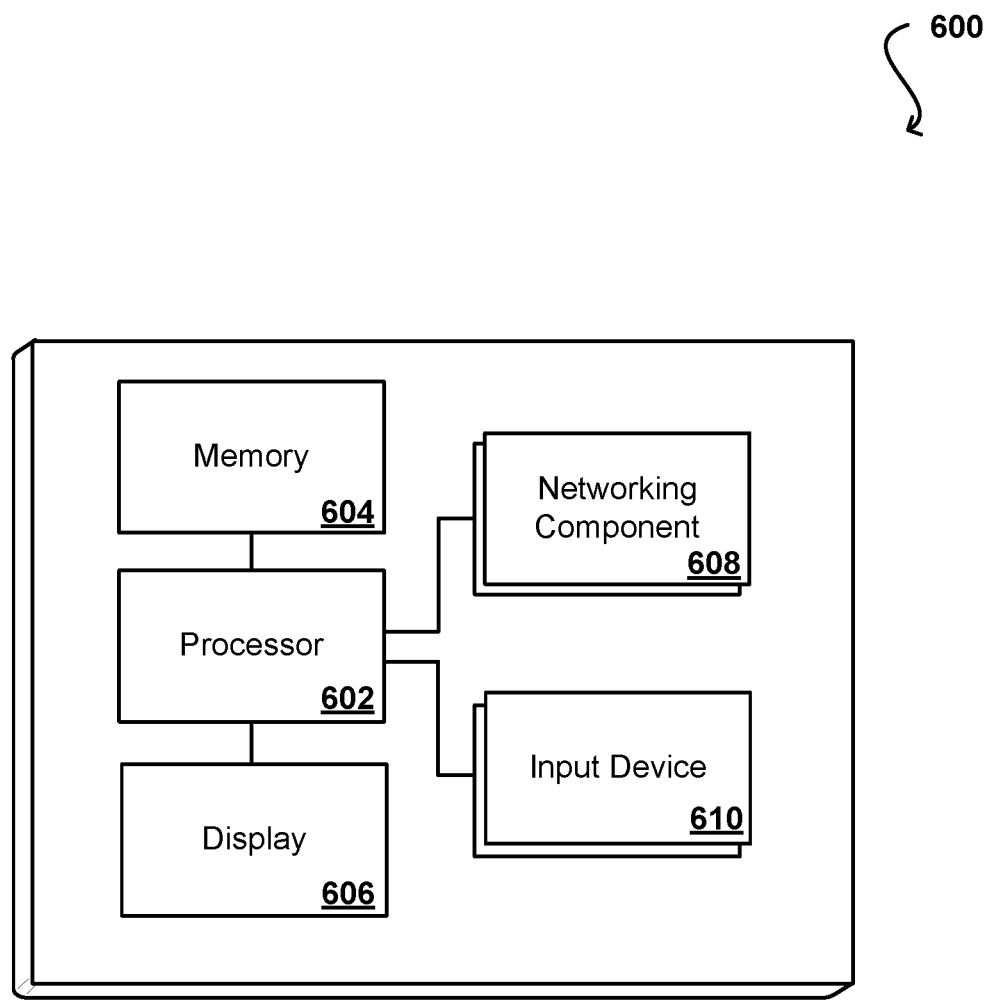
FIG. 6 illustrates example components of a computing device that can be used to implement aspects of various embodiments.

FIG. 6 illustrates a set of basic components of an example computing device 600 that can be utilized to implement aspects of the various embodiments. In this example, the device includes at least one processor 602 for executing instructions that can be stored in a memory device or element 604. As would be apparent to one of ordinary skill in the art, the device can include many types of memory, data storage or computer-readable media, such as a first data storage for program instructions for execution by the at least one processor 602, the same or separate storage can be used for images or data, a removable memory can be available for sharing information with other devices, and any number of communication approaches can be available for sharing with other devices. The device may include at least one type of display element 606, such as a touch screen, electronic ink (e-ink), organic light emitting diode (OLED) or liquid crystal display (LCD), although devices such as servers might convey information via other means, such as through a system of lights and data transmissions. The device typically will include one or more networking components 608, such as a port, network interface card, or wireless transceiver that enables communication over at least one network. The device can include at least one input device 610 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    receiving a request to initiate a session on behalf of a user, wherein the request includes user credentials of the user and a resource;
    determining that the user does not have access to the resource;
    identifying an organization account, wherein the user has a user identity with the organization account;
    verifying that the user credentials are valid for the organization account based on the user identity;
    identifying a resource account that has authorization to access the resource, wherein the resource account is a sub-account of the organization account in an organizational hierarchy;
    initiating a session on behalf of the user under the sub-account; and
    providing a session token for use within the session under the resource account.

2. The computer-implemented method of claim 1, further comprising:
    receiving a subsequent request to access the resource, wherein the subsequent request includes the session token;
    verifying the subsequent request based on the session token; and
    causing the resource to be accessible to the user.

3. The computer-implemented method of claim 2, wherein verifying the subsequent request includes determining that a current session matches the session for which the session token is valid.

4. The computer-implemented method of claim 1, further comprising:
    storing additional information related to the session; and
    verifying a subsequent request to access the resource based on the additional information.

5. The computer-implemented method of claim 4, wherein the additional information includes at least one of a session identifier, a user identifier, the organization account, the resource account, and a version of the organizational hierarchy.

6. The computer-implemented method of claim 4, wherein the additional information is stored separately from the session token.

7. The computer-implemented method of claim 4, wherein the session token includes the additional information.

8. The computer-implemented method of claim 1, further comprising:
    determining that the resource is available; and
    provisioning the resource for the session.

9. The computer-implemented method of claim 1, further comprising:
    creating a master account corresponding to the organizational hierarchy;
    organizing a plurality of resource accounts as sub-accounts under the master account in the organizational hierarchy; and
    enabling user identities, associated with a specified organization account, to be attached at one or more points in the organizational hierarchy and projected into one or more resource accounts for which the specified organization account is a higher-level account.

10. The computer-implemented method of claim 1, wherein the request includes a resource amount.

11. The computer-implemented method of claim 10, wherein the resource amount one of a number of tasks that to be performed, a period of time that access is required, and a renewal requirement.

12. A computer-implemented method, comprising:
    receiving a request to initiate a session on behalf of a user, wherein the request includes user credentials of the user and a resource;
    identifying an organization account, wherein the user has a user identity with the organization account;
    verifying that the user credentials are valid with the organization account based on the user identity;
    identifying a resource account that has access to the resource, wherein the resource account is a sub-account of the organization account;
    initiating a session on behalf of the user under the sub-account;
    providing a session token for use within the session under the resource account;
    receiving a subsequent request including the session token and the resource; and
    determining validity of the subsequent request based on the session token.

13. The computer-implemented method of claim 12, further comprising:
    granting access to the resource based on determining that the session token is valid.

14. The computer-implemented method of claim 12, further comprising:
    determining that the session token is invalid; and
    causing the subsequent request to be denied.

15. The computer-implemented method of claim 14, further comprising:
    sending a notification that the subsequent request to access the resource was denied.

16. The computer-implemented method of claim 12, further comprising:
    identifying a resource amount associated with the subsequent request;
    determining that the resource amount is unavailable; and
    causing the subsequent request to be denied.

17. The computer-implemented method of claim 12, further comprising:

determining that the resource is available; and
provisioning the resource for the session.

18. A system, comprising:
at least one processor; and
memory including instructions that, when executed by the at least one processor, cause the system to:
receive a request to initiate a session on behalf of a user, wherein the request includes user credentials of the user and a resource;
identify an organization account, wherein the user has a user identity with the organization account;
verify that the user credentials are valid with the organization account based on the user identity;
identify a resource account that has access to the resource, wherein the resource account is a sub-account of the organization account;
initiate a session on behalf of the user under the sub-account;
provide a session token for use within the session under the resource account;
receive a subsequent request including the session token and the resource; and
determine validity of the subsequent request based on the session token.

19. The system of claim 18, wherein the instructions when executed further cause the system to:
grant access to the resource based on determining that the session token is valid.

20. The system of claim 18, wherein the instructions when executed further cause the system to:
determine that the session token is invalid; and
cause the request to be denied.

* * * * *